(12) United States Patent
Koshy

(10) Patent No.: US 9,407,321 B2
(45) Date of Patent: Aug. 2, 2016

(54) METHOD FOR COMMUNICATION AND VALIDATION OF ELECTRICAL SIGNALS

(71) Applicant: KFX CIRCUITS AND SYSTEMS PRIVATE LIMITED, Bangalore (IN)

(72) Inventor: Nishil Thomas Koshy, Bangalore (IN)

(73) Assignee: KFX CIRCUITS AND SYSTEMS PRIVATE LIMITED, Bangalore (IN)

( * ) Notice: Subject to any disclaimer, the term of this patent is extended or adjusted under 35 U.S.C. 154(b) by 0 days.

(21) Appl. No.: 14/376,357

(22) PCT Filed: Jan. 30, 2013

(86) PCT No.: PCT/IN2013/000062
§ 371 (c)(1),
(2) Date: Aug. 1, 2014

(87) PCT Pub. No.: WO2013/118146
PCT Pub. Date: Aug. 15, 2013

(65) Prior Publication Data
US 2015/0010094 A1 Jan. 8, 2015

(30) Foreign Application Priority Data
Feb. 6, 2012 (IN) ............................. 438/CHE/2012

(51) Int. Cl.
| | |
|---|---|
| *H04B 3/00* | (2006.01) |
| *H04L 25/00* | (2006.01) |
| *H04B 3/30* | (2006.01) |
| *H04N 7/10* | (2006.01) |
| *H04L 25/02* | (2006.01) |
| *H04M 11/06* | (2006.01) |
| *H04L 12/28* | (2006.01) |
| *H04L 12/26* | (2006.01) |
| *H04L 29/06* | (2006.01) |
| *H04B 3/50* | (2006.01) |

(52) U.S. Cl.
CPC .. *H04B 3/30* (2013.01); *H04B 3/00* (2013.01); *H04B 3/50* (2013.01); *H04L 12/2836* (2013.01); *H04L 25/028* (2013.01); *H04L 25/0278* (2013.01); *H04L 25/0292* (2013.01); *H04L 43/0817* (2013.01); *H04L 43/12* (2013.01); *H04L 69/08* (2013.01); *H04M 11/066* (2013.01); *H04N 7/102* (2013.01)

(58) Field of Classification Search
CPC .................... H04N 5/23212; H04N 5/23293
See application file for complete search history.

(56) References Cited

U.S. PATENT DOCUMENTS

| | | | | |
|---|---|---|---|---|
| 4,833,392 | A * | 5/1989 | Hahn ................. | G01R 27/2641 324/300 |
| 6,885,275 | B1 * | 4/2005 | Chang ........................... | 336/200 |
| 2008/0150392 | A1 * | 6/2008 | Delevoye ........... | H03H 9/02338 310/311 |
| 2012/0267960 | A1 * | 10/2012 | Low et al. ..................... | 307/104 |

* cited by examiner

*Primary Examiner* — Shuwang Liu
*Assistant Examiner* — Gina McKie
(74) *Attorney, Agent, or Firm* — Barry Choobin; Patent 360 LLC

(57) ABSTRACT

The various embodiments herein provide an improved system for communicating data over a wired connection. The system comprising a transmitting end, a switching circuit provided at the transmitting end to generate a propagating signal disturbance according to an input signal data received from a source network, a receiving end and a receiver circuit provided at the receiving end to detect the propagating signal disturbance and to regenerate the transmitted signal data from the received signal. The propagated signal disturbance is detected at the receiving end without a need for a common ground reference. The propagating disturbance is created by inducing an electron distribution change at one end of the wired connection and propagated along the length of the wire. The propagating disturbance is generated using one of an inductor, a capacitor and a switching device.

5 Claims, 11 Drawing Sheets

METHOD FOR COMMUNICATION AND VALIDATION OF ELECTRICAL SIGNALS

RELATED APPLICATION

The present application is a national phase application of the International Application PCT/IN2013/000062 filed 30 Jan. 2013, which claims the priority of the Indian Provisional Patent Application No. 438/CHE/2012 filed on 6 Feb. 2012, the entire contents of which are incorporated herein by the way of reference.

BACKGROUND

1. Technical Field

The embodiments herein generally relate to communication systems and methods and particularly relates to an improved system and method for wired data communication. The embodiments herein more particularly relates to a system and method for providing high speed, low power system level communication between different circuits or devices, and also relates to a system and method for validation of transmitted data signals.

2. Description of the Related Art

Generally a wired communication refers to a transmission of data over a wire-based communication technology. The examples for a wired communication network include the telephone networks, a cable television, an internet access, a fiber-optic communication, circuit level communication and the like. A waveguide, used for high-power applications, is considered as a wired communication scheme.

Conventional schemes for wired communication between devices or circuits of a system primarily rely on driving a voltage or current on the interconnected wire to predefined levels with respect to a common ground reference. For receiving or validating the transmitted signals, the voltage or current on the interconnected wire is monitored with respect to the same ground reference.

Standard electrical signaling for wired communication relies on driving the connecting wire to predefined voltage or current levels with respect to a common ground reference. Each time the signal approaches the limits of the predefined voltage or current levels, repeaters or buffers are added to restore its strength. While a lot of progress has been made by innovative modulation and signaling schemes to reduce power and increase data rates, wired communication is severely limited by the Resistance, Inductance, Capacitance (RLC) characteristics of the wired medium. The Resistance Capacitance (RC) loading delays and heating loss due to current flow ($I^2R$) can use very quickly for long interconnects. In order to overcome this bottleneck an alternate method of communication needs to be explored.

Hence, there is a need for a system and method for generating and transmitting data signal for system level communication using existing switching devices. Also, there is a need for a system and method to retrieve and decode the transmitted data signal without any loss and distortion. Further, there is a need for a system and method for providing high speed and efficient data communication through a wired medium.

The above mentioned shortcomings, disadvantages and problems are addressed herein and which will be understood by reading and studying the following specification.

SUMMARY

The primary object of the embodiments herein is to provide a communication scheme by generation and detection of a charge disturbance for data transmission over a wired network.

Another object of the embodiments herein is to provide a communication system and method for generating data signals using an existing switching circuit at the transmitter end.

Another object of the embodiments herein is to provide a system and method for communicating data signals by propagating the generated charge disturbance through the wired medium.

Another object of the embodiments herein is to provide a system and method for communicating data signals without using a common ground reference.

Another object of the embodiments herein is to provide a system and method for detecting the transmitted charge disturbance at the receiving end to monitor the switching signals on the wire.

These and other objects and advantages of the present invention will become readily apparent from the following detailed description taken in conjunction with the accompanying drawings.

The various embodiments herein provide an improved system for communicating data over a wired connection. The system comprising a transmitting end, a switching circuit provided at the transmitting end to generate a propagating signal disturbance according to an input signal data received from a source network, a receiving end and a receiver circuit provided at the receiving end to detect the propagating signal disturbance and to regenerate the transmitted signal data from the received signal. The propagated signal disturbance is detected at the receiving end without a need for a common ground reference.

According to an embodiment herein, the wired connection comprises a single wire conductor and an optional common ground connection.

According to an embodiment herein, the propagating disturbance is created by inducing an electron distribution change at one end of the wired connection and propagated along the length of the wire. Here the propagating disturbance is generated using an inductor, a capacitor or a switching device.

According to an embodiment herein, the input signal is an AC signal or a DC signal whose amplitude, phase and frequency is varied according to a data obtained from the source network.

According to an embodiment herein, the receiver further comprises at least one of an inductor, a capacitor, a resistor and a delay line connected to one of the terminals of the wired connection to regenerate the propagating signal disturbance at the receiving end.

According to an embodiment herein, the system is further adapted to build at least one of a serial, parallel or a multipoint distribution communication interface between a transmitting device and one or more receiving devices.

According to an embodiment herein, the system for communicating data over a wired connection is further adapted to communicate between circuits in different ground planes or operating on different voltage levels.

According to an embodiment herein, the system is further adapted to analyze or validate at least one of timing and logic of signals carried on one or more wired connections without using a common ground reference.

According to an embodiment herein, the system is also adapted to communicate at lower power between circuits or devices having a common ground reference.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the present invention are shown in some drawings and not in others. This is done for convenience only as each feature may be combined with any or all of the other features in accordance with the present invention.

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide an improved system for communicating data over a wired connection. The system comprising a transmitting end, a switching circuit provided at the transmitting end to generate a propagating signal disturbance according to an input signal data received from a source network, a receiving end and a receiver circuit provided at the receiving end to detect the propagating signal disturbance and to regenerate the transmitted signal data from the received signal. The propagated signal disturbance is detected at the receiving end without a need for a common ground reference. The wired connection comprises a single wire conductor and an optional common ground connection.

The propagating disturbance is created by inducing an electron distribution change at one end of the wired connection and propagated along the length of the wire.

The input signal is an AC signal or a DC signal whose amplitude, phase and frequency is varied according to a data obtained from the source network.

The receiver further comprises at least one of an inductor, a capacitor, a resistor and a delay line connected to one of the terminals of the wired connection to regenerate the propagating signal disturbance at the receiving end.

The system is further adapted to build at least one of a serial, parallel or a multipoint distribution communication interface between a transmitting device and one or more receiving devices.

The system for communicating data over a wired connection is further adapted to communicate between circuits in different ground planes or operating on different voltage levels.

The system is further adapted to analyze or validate at least one of timing and logic of signals carried on one or more wired connection without using a common ground reference. Also the system is adapted to communicate at lower power between circuits or devices having a common ground reference.

Figure 1A:
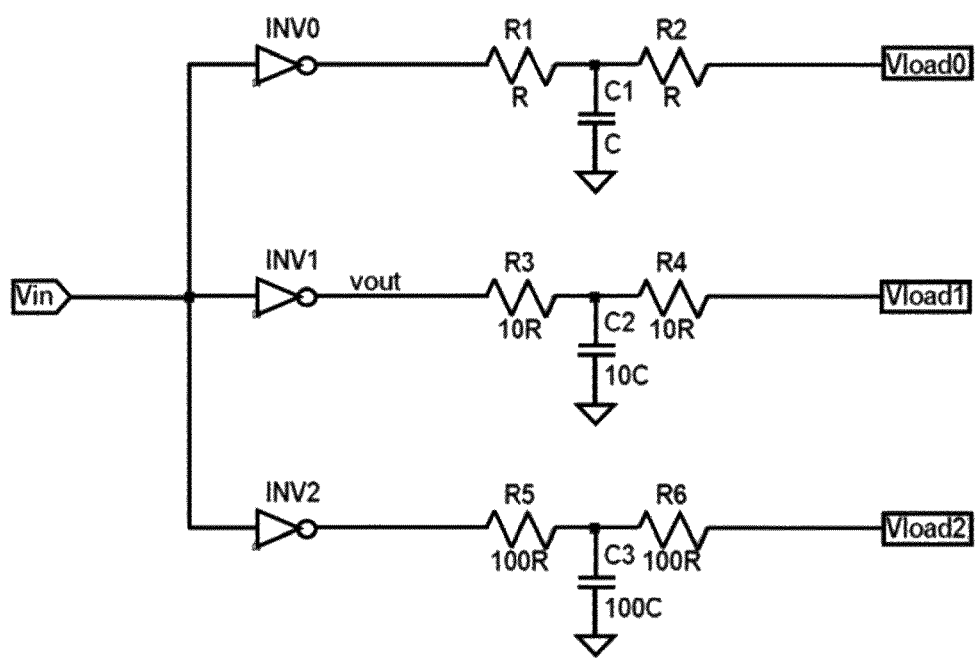
FIG. 1a illustrates a circuit diagram implementing a CMOS inverter for sending signals between two or more circuits, according to an embodiment herein.

FIG. 1a illustrates a circuit diagram implementing a CMOS inverter for sending signals between two or more circuits, according to an embodiment herein. The CMOS inverter is the line driver circuit used for sending signals using wires connecting two or more circuits or devices that need to communicate with each other. The FIG. 1a shows three identical CMOS inverters driving different wire loads in three circuits, which are a first circuit, a second circuit and a third circuit. The first circuit comprises a CMOS inverter as INV0, a resistor R1 and a resistor R2, a capacitor C1 connected to ground. The input to first circuit is given to the CMOS inverter INV0 as Vin, and the output from the first circuit is taken after the resistor R2 as Vload0. The second circuit comprises a CMOS inverter as INV1, a resistor R3 and a resistor R4, a capacitor C2 connected to ground. The input to second circuit is given to the CMOS inverter INV1 as Vin, and the output from second circuit is taken after the resistor R4 as Vload1. Similarly, the third circuit comprises a CMOS inverter as INV2, a resistor R5 and a resistor R6, a capacitor C3 connected to ground. The input to third circuit is given to the CMOS inverter INV2 as Vin, and the output from third circuit is taken after the resistor R6 as Vload2. The resistance value of the two resistors in the first, second and third circuits are equal, i.e. R1 is equal to R2 in the first circuit, R3 is equal to R4 in the second circuit, and R5 is equal to R6 in the third circuit. Also, if the resistance and capacitance value of the first circuit is assumed to be X, then the resistance and capacitance value for the second circuit is ten times of X, and that for the third circuit is hundred times of X. Hence, in the first circuit, the resistance value for R1 and R2 is R, and the capacitance value for C1 is C with a wire load connecting to "load0". Similarly, in the second circuit, the resistance value for R3 and R4 is 10R, and the capacitance value for C2 is 10C for a wire connecting to "load1", and in the third circuit, the resistance value for R5 and R6 is 100R, and the capacitance value for C3 is 100C for a wire connecting to "load2". The FIG. 1 represents three circuits for explaining the embodiments, but there is a provision for connecting multiple parallel circuits/links using different wires or the same input signal being transmitted to multiple locations at different wire lengths. The load0, load1 and the load2, and the respective CMOS inverters/line drivers INV0, INV1 and INV2 are interconnected via a common low impedance ground plane.

Figure 1B:
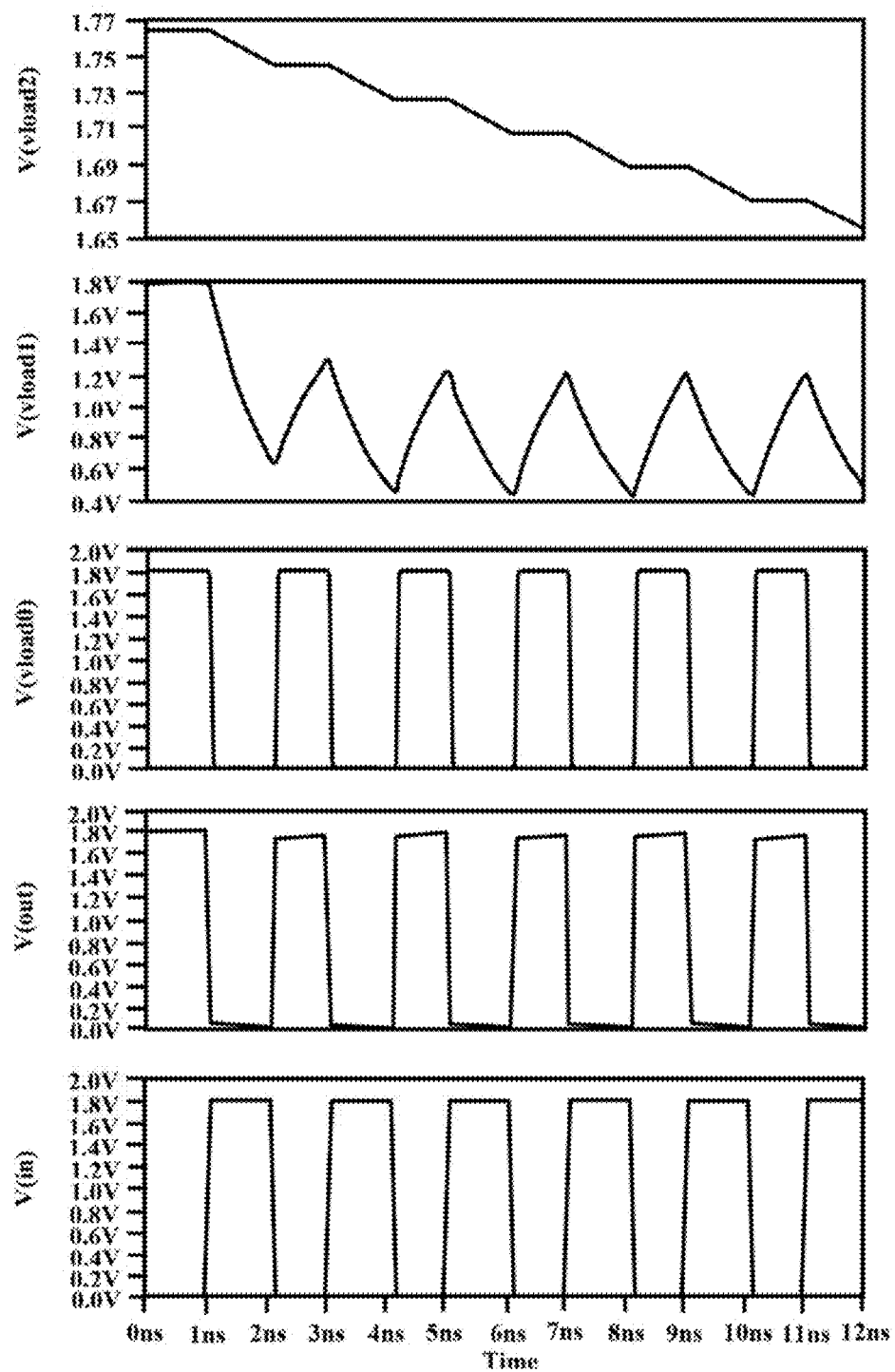
FIG. 1b illustrates different waveforms for the CMOS inverter based transmitting circuit, according to an embodiment herein.

FIG. 1b illustrates different waveforms for the CMOS inverter based transmitting circuit, according to an embodiment herein. The FIG. 1b displays the different voltage waveforms for the circuit illustrated in the FIG. 1a. The Vin represents the input to the driving CMOS inverters, while Vout represents the CMOS inverter output. The received voltages for the three different wire loads load0, load1 and load2 are captured as V(vload0), V(vload1) and V(vload2) respectively. The FIG. 1b displays five waveforms for each voltage, where the voltages are represented in y-axis, while the x-axis represents time in nanoseconds (ns). As per the standard voltage signaling, the received signal quality at the three loads significantly degrades as the wire load is increased from load0 to load2. The RC line loading delay also sets an upper limit on the speed of the transmitted data besides leading to receivers with different wire loads receiving the data at different times, assuming voltage signaling is used.

Figure 2A:
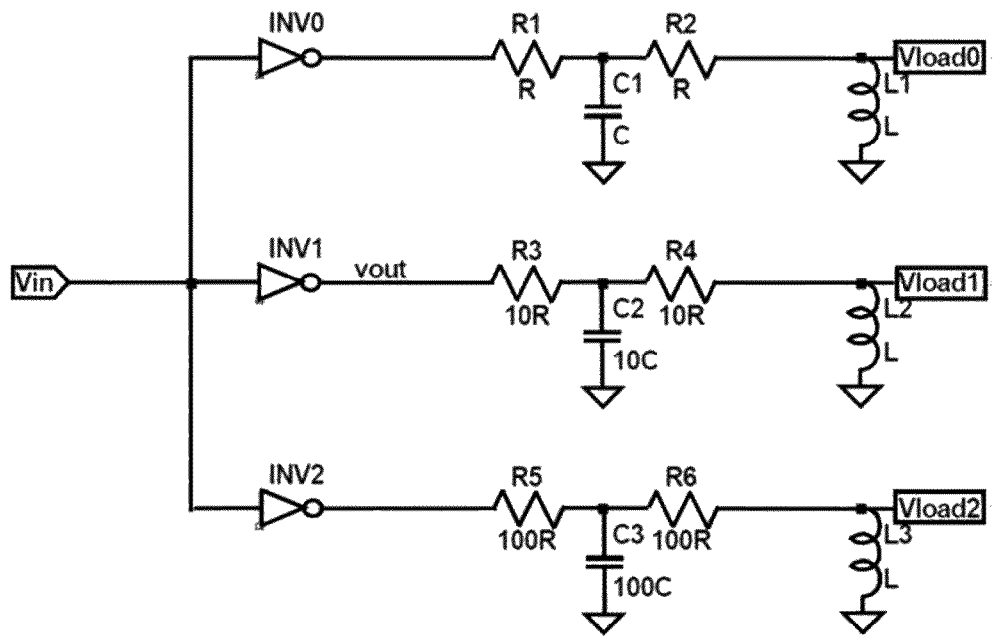
FIG. 2a illustrates a circuit diagram implementing a CMOS inverter for transmitting data signals and an inductor for receiving the transmitted data signal, according to an embodiment herein.

FIG. 2a illustrates to circuit diagram implementing a CMOS inverter for transmitting data signals and an inductor for receiving the transmitted data signal, according to an embodiment herein. The illustrated circuit represents an alternate system where an inductor based receiver, detects a current disturbance on a connecting wire instead of detecting a voltage signal on the connecting wire, and then subsequently regenerates the data signal. The FIG. 2a shows three identical CMOS inverters driving different wire loads in three different circuits i.e. in a first circuit, a second circuit and a third circuit. The first circuit comprises a CMOS inverter as INV0, a resistor R1 and a resistor R2, a capacitor C1 connected to ground and an inductor L1 connected to the ground. The input to first circuit is given to the CMOS inverter INV0 as Vin, and the output from the first circuit is taken across the inductor L1 as Vload0. The second circuit comprises a CMOS inverter as INV1, a resistor R3 and a resistor R4, a capacitor C2 connected to ground and an inductor L2 connected to the ground. The input to second circuit is given to the CMOS inverter INV1 as Vin, and the output from second circuit is taken across the inductor L2 as Vload1. Similarly, the third circuit comprises a CMOS inverter as INV2, a resistor R5 and a resistor R6, a capacitor C3 connected to ground and an inductor L3 connected to the ground. The input to third circuit is given to the CMOS inverter INV2 as Vin, and the output from third circuit is taken across the inductor L3 as Vload2. The resistance value of the two resistors in the first, second and the third circuits are equal, i.e. R1 is equal to R2 in the first circuit, R3 is equal to R4 in the second circuit and R5 is equal to R6 in the third circuit. The inductance value for L1, L2 and L3 are equal to L. Also, if the resistance and capacitance value of the first circuit is assumed to be X, then the resistance and capacitance value for the second circuit is ten times of X, and that for the third circuit is hundred times of X. Hence, in the first circuit, the resistance value for R1 and R2 is R, and the capacitance value for C1 is C with a wire load connecting to "load0". Similarly, in the second circuit, the resistance value for R3 and R4 is 10R, and the capacitance value for C2 is 10C for a wire connecting to "load1", and in the third circuit, the resistance value for R5 and R6 is 100R, and the capacitance value for C3 is 100C for a wire connecting to "load2". The FIG. 2a represents three circuits for explaining the embodiments, but there is a provision for connecting multiple parallel circuits/links using different wires or the same input signal being transmitted to multiple locations at different wire lengths. The load0, load1 and the load2, and the respective CMOS inverters/line drivers INV0, INV1 and INV2 are interconnected via a common low impedance ground plane. Here, the inductors L1, L2 and L3 of the three circuits are used to convert the magnetic field variations produced by the displacement current of the propagating disturbance into a voltage signal. In addition, current flow changes due to the presence of a common ground also lead to voltage signals across the inductor being used.

Figure 2B:
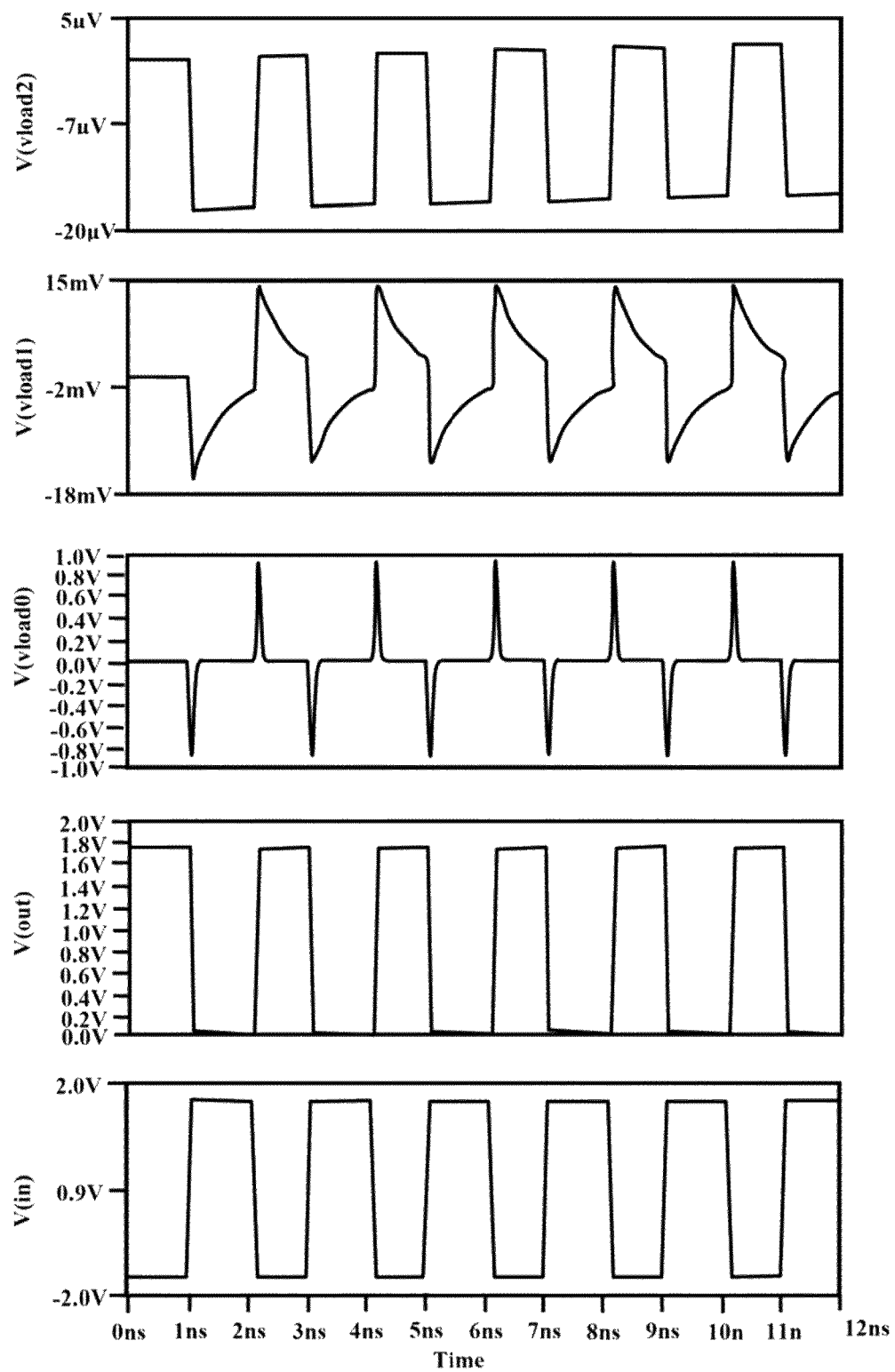
FIG. 2b illustrates different waveforms for a circuit implementing a CMOS inverter for transmitting data signals and an inductor for receiving transmitted data signals, according to an embodiment herein.

FIG. 2b illustrates different waveforms for a circuit implementing a CMOS inverter for transmitting data signals and an inductor for receiving transmitted data signals, according to an embodiment herein. The FIG. 2b displays the different voltage waveforms for the circuit illustrated in the FIG. 2a. The Vin represents the input to the driving CMOS inverters, while Vout represents the CMOS inverter output. The received voltages across the three different wire loads load0, load1 and load2 are captured as V(vload0), V(vload1) and V(vload2) respectively. The FIG. 2b displays five waveforms for each voltage, where the voltages are represented in y-axis, while the x-axis represents time in nanoseconds (ns). From the corresponding voltage waveforms, it is observed that the received voltage signals although have different strengths, do not suffer from different RC wire loading delays as the load is increased from load0 to load2. If the received voltage signals are fed into zero crossing detector circuits, the transmitted signal can be accurately regenerated at all three receivers. The delay between the received signals differs only by the propagation delay of the charge disturbance and not by the RC wire load typical of voltage signaling. This method represents a significant advancement in terms of data rate, range, signal quality and skew. The method also provides an easy implementation to increase the range and data rate of serial interfaces or for implementing parallel interfaces with lesser skew or for clock distribution at a system level.

Figure 3A:
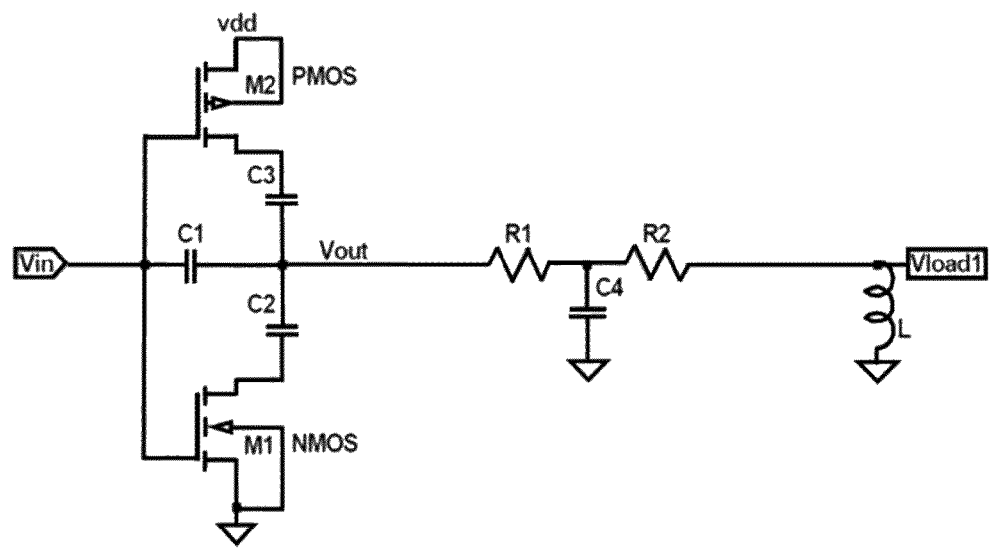
FIG. 3a illustrates a circuit diagram implementing a CMOS switch for generating charge disturbance and an inductor based receiver for detecting the charge disturbance, according to an embodiment herein.

FIG. 3a illustrates a circuit diagram implementing a CMOS switch for generating charge disturbance and an inductor based receiver for detecting the charge disturbance, according to an embodiment herein. The circuit represents an alternate circuit where the line driver is replaced from a CMOS inverter to a CMOS switching circuit that creates charge disturbances on the connected wire without driving to supply and ground. The FIG. 3a shows a CMOS switch comprising a PMOS and NMOS transistor. The PMOS and NMOS transistors comprise four terminals which are a gate, a drain, a source and a substrate. In the PMOS transistor, the source & substrate terminals are connected to the supply voltage vdd, the drain terminal is connected to a capacitor C3 and the gate terminal is connected to an input voltage source Vin. In the NMOS transistor, the source & substrate terminals are connected to the ground, the drain terminal is connected to a capacitor C2, and the gate terminal is connected to an input voltage source Vin. The other ends of the capacitor C2 and C3 are connected to each other, and from which the output terminal Vout of the CMOS switch is measured. Also, a capacitor C1 is connected between the Vin and the Vout. The figure further comprises a resistor R1, a resistor R2 and a capacitor C4 connected between the ground a point between the two resistors R1 and R2, representing a wire load and an inductor L connected between the other end of the wire load and ground, to detect the charge disturbance at the receiving end. In the circuit, since input voltage signal is not inverted, the circuit has lower driver latency than the inverting driver. The partial coupling of charges from the input signal to the output node also enables this circuit to transmit signals that are near or sub-threshold.

Figure 3B:
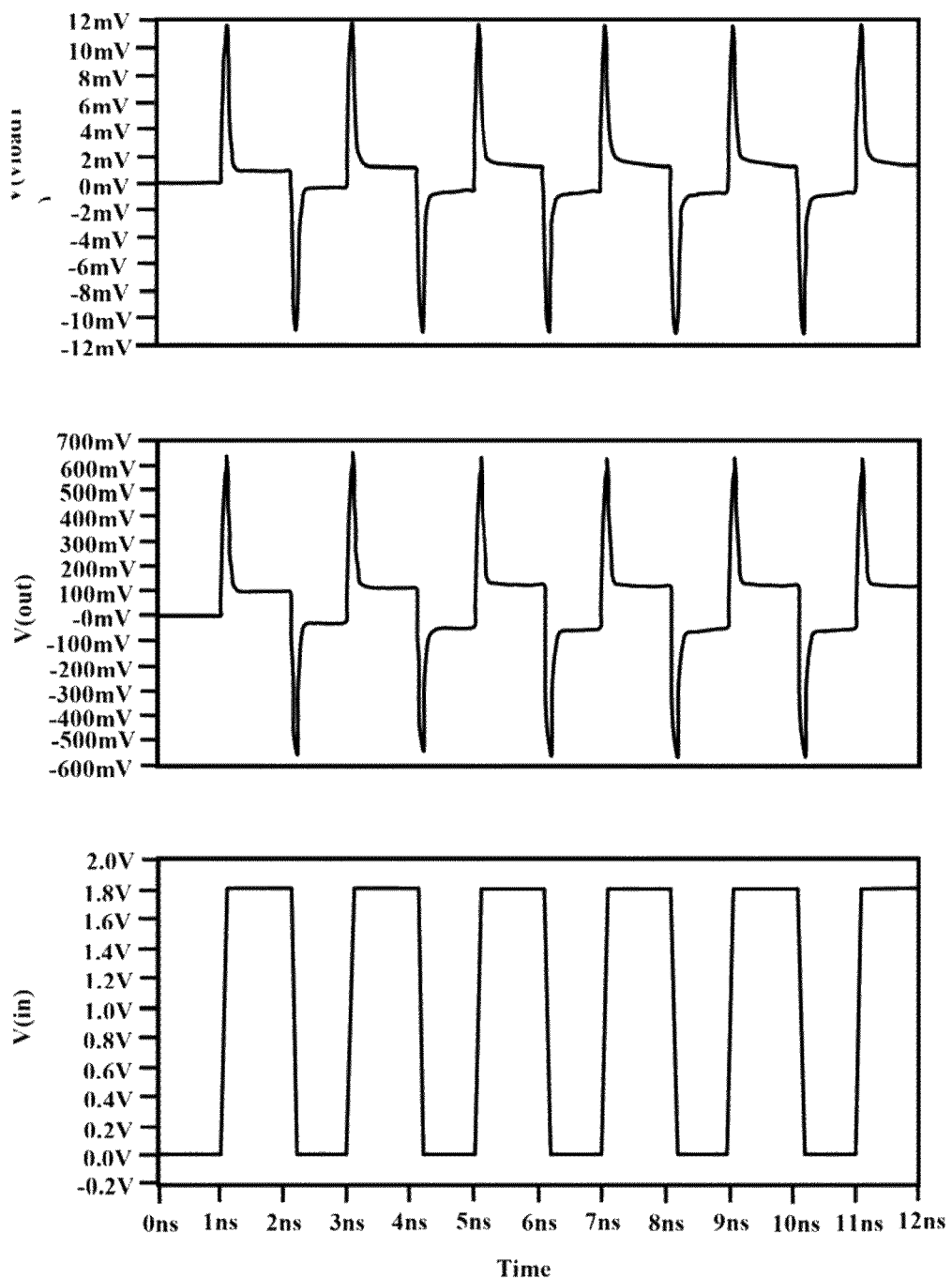
FIG. 3b illustrates different voltage versus time waveforms for a circuit implementing a CMOS switch for generating charge disturbance and an inductor based receiver for detecting the charge disturbance, according to an embodiment herein.

FIG. 3b illustrates different voltage versus time waveforms for a circuit implementing a CMOS switch for generating charge disturbance and an inductor based receiver for detecting the charge disturbance, according to an embodiment herein. The FIG. 3b displays the different voltage waveforms for the circuit illustrated in the FIG. 3a. The Vin represents the input to the driving PMOS and NMOS transistors, while Vout represents the voltage at the junction of capacitors C1, C2 and C3. The FIG. 3b illustrates individual waveform for the input voltage, output voltage and the load voltage, where the voltage is represented along the y-axis, while the x-axis represents time in nanoseconds (ns). The corresponding waveform for an input voltage is captured. When the Vout is compared to the output of a standard CMOS inverter, the waveform depicts that the Root Mean Square (RMS) voltage on the connecting wire is very low which leads to lower line losses, wire heating and electro-migration issues.

Figure 4A:
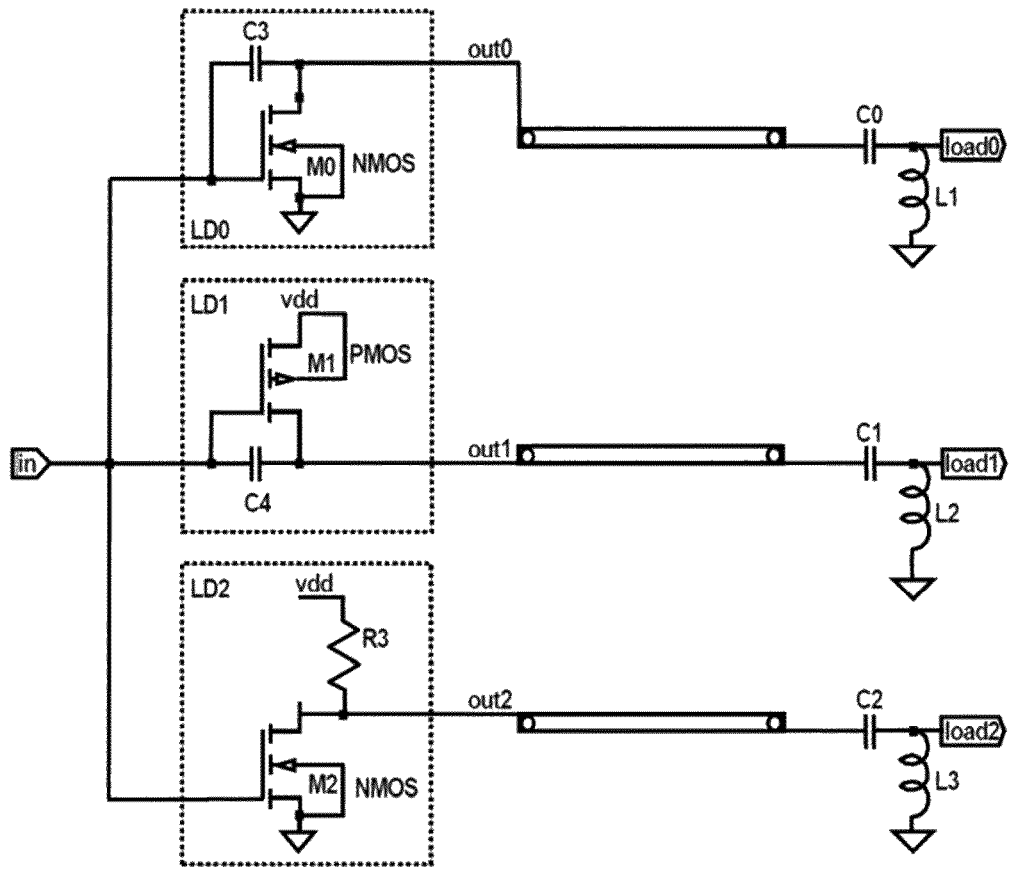
FIG. 4a illustrates different circuit diagrams for generating charge disturbance and detecting the generated charge disturbance, according to an embodiment herein.

FIG. 4a illustrates different circuit diagrams for generating charge disturbance and detecting the generated charge disturbance, according to an embodiment herein. In particular, the FIG. 4a shows an alternate system that is used in place of a common system level inter-connect driver circuit, i.e. an open drain/open collector drivers. Three different line driver configurations LD0, LD1 and LD2 are shown, which take input from a common voltage source Vin and drive an independent but identical wire loads and receiver circuits. The receiver circuit uses an inductor at the receiver end to detect the propagating disturbances on the connecting wires. The driver circuit LD0 is an NMOS impedance switching driver which drives an output node "out0" and an inductor L1 as a receiver. The driver circuit LD1 is a PMOS based impedance switching driver which drives an output node "out1" and an inductor L2 as a receiver Similarly, the driver circuit LD2 is a standard open drain driver which drives an output node "out2" and an inductor L3 as a receiver. The inductors L1, L2 and L3 are coupled to the connecting wire using capacitors C1, C2 and C3 respectively, to avoid changing the direct current (DC) operating point of the connecting wire. This is important when the connecting wire is connected to multiple drivers and receivers. The PMOS based impedance switching circuit is suitable for systems where the connecting wire is normally held high while the NMOS based impedance switching circuit is more suitable for systems where the line is typically held low.

Figure 4B:
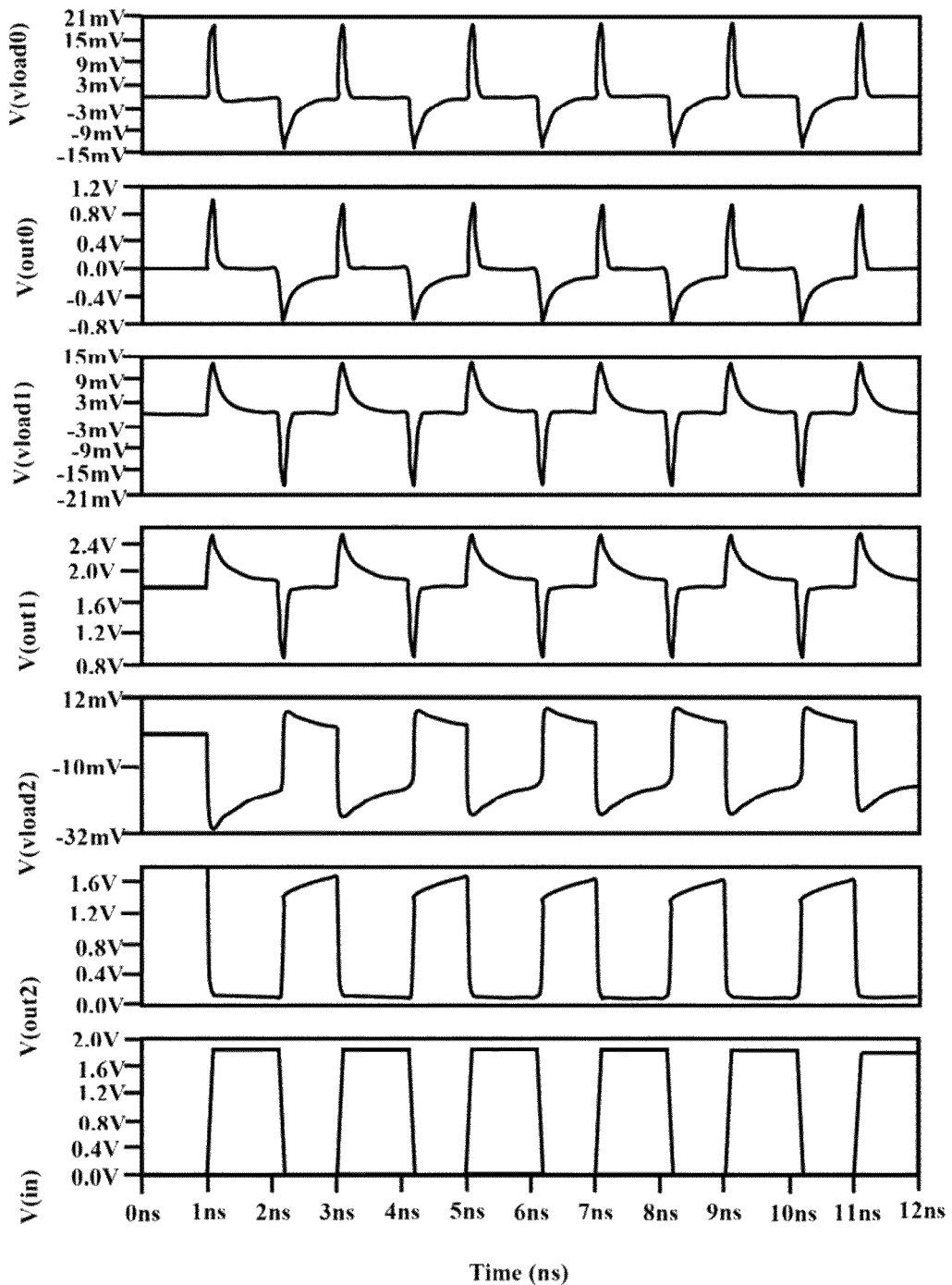
FIG. 4b illustrates different waveforms captured for an open drain circuit and two impedance switching drivers, according to an embodiment herein.

FIG. 4b illustrates different waveforms captured for an open drain circuit and two impedance switching drivers, according to an embodiment herein. The FIG. 4b displays the different voltage waveforms for the three circuits illustrated in the FIG. 4a. The Vin represents the input to the three driving circuits LD0, LD1 and LD2, while the output voltage for the corresponding driver circuits is represented by V(out0), V(out1) and V(out2). The voltage at the load of the three driving circuits LD0, LD1 and LD2 is represented as V(vload0), V(vload1) and V(vload2) respectively. The FIG. 4b displays seven waveforms for each type of voltage captured in the circuit of FIG. 4a. The voltages are represented in y-axis, while the x-axis represents time in nanoseconds (ns). From the observation of the waveforms, the LD2 i.e. the standard open drain output transmits an inverted signal while the LD0 and LD1, i.e. NMOS and PMOS based impedance switching drivers transmit data in the same phase. For regenerating the original transmitted data signal, all the received signals are passed through zero crossing detectors or any other preferred circuit. The zero crossing circuit accurately regenerates the data signal with the only difference being the phase inversion for the standard open drain circuit.

Figure 5A:
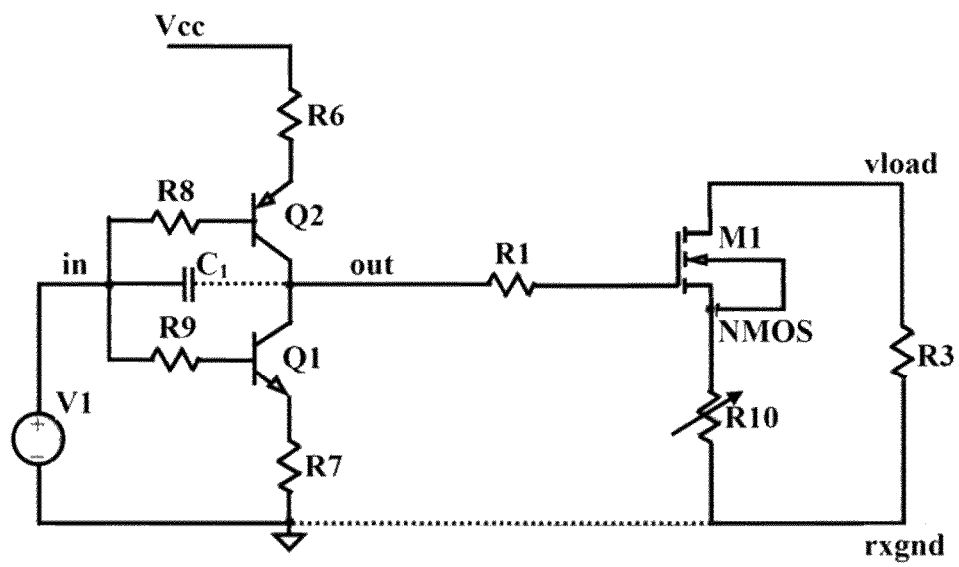
FIG. 5a illustrates a circuit diagram implementing a modified inverter using bipolar transistors to transmit data and a MOSFET based circuit to receive the data, according to an embodiment herein.

FIG. 5a illustrates a circuit diagram implementing a modified inverter using bipolar transistors to transmit data and a MOSFET based circuit to receive the data, according to an embodiment herein. The modified inverter is formed by a PNP transistor Q2 and a NPN transistor Q1. The transmitting end and receiving end configurations are independent of each other and allows to be used in alternate configurations. The base terminals of the transistors Q1 and Q2 are connected in parallel at a node "in" through a resistance R9 and R8 respectively. A voltage source V1 is connected between ground and the base terminals of the two transistors Q1 and Q2. The emitter terminal of the transistor Q2 is connected to a voltage source Vcc through a resistance R6, whereas the emitter terminal of the transistor Q1 is connected to ground through a resistor R7. The output of the modified inverter is obtained at an "out" node, where the two collector terminals of the transistors Q1 and Q2 are connected to each other. Connecting an optional capacitor C1 between nodes "in" and "out" will result in a different phase and amplitude for the "out" node due to the direct capacitive coupling from the "in" node. This also represents the simplest method to produce amplitude and phase shill modulated signals. The signal at the "out" node represents the transmitted output voltage of the line driver. It is connected to the receiving circuit through a wire load represented by the resistance R1. The received signal is connected to the gate terminal of a NMOS MOSFET M1. The source terminal of the MOSFET M1 is connected to the receiver ground through a variable resistance R10. A load resistance R3 is connected between the drain terminal and the receiver ground. The receiver ground may be an independent local ground or optionally connected to the transmitter ground.

With respect to FIG. 5a, on the transmitting side when the voltage at node "in" approaches to the voltage at the ground node, the transistor Q1 act as an open circuit while the transistor Q2 act like a closed circuit. This results in transferring of charges from the Vcc to the "out" node. Similarly, when the voltage level at the "in" node approaches to the voltage level at the Vcc, the transistor Q2 acts as an open circuit and the transistor Q1 acts like a closed circuit transferring charges from "out" node to ground. The resistance values of resistors R6 and R7 is changed to lower the power consumed by the line driver without impacting the functionality as only momentary switching of the transistors Q1 and Q2 is required to create charge imbalances on the connected wire/conductor on the "out" node. This charge imbalance is transmitted across the length of the conductor as a propagating wave.

The BJT transistors Q1 & Q2 can also be replaced with NMOS and PMOS MOSFET transistors respectively. When using MOSFET transistors, the gate terminals of both the devices can be connected together and driven by the input signal with a single resistor instead of the two resistors R8 and R9 used in the case of bipolar devices. This scheme can be used for low power and low delay broadband CMOS line drivers.

Further with respect to FIG. 5a, in the receiving side, an inherent gate capacitance of the MOSFET transistor M1 is used to detect the propagating charge disturbance and convert it to a voltage that is further processed to recover the transmitted signal. The resistor R10 connected between the source terminal of the MOSFET M1 and the receiver ground is adjusted to control the received signal strength and loading on the transmission line. The received signal can be tapped from any of the terminals of the MOSFET with the drain terminal offering the maximum isolation from both the input and ground nodes. Further, since no explicit inductors, capacitors or delay lines are used; the embodiments herein provide an ideal system schema for communication within and between monolithic circuits. In addition, the receiver ground is either connected to the transmitter ground or is independent. This makes this receiver configuration an ideal choice for creating non-intrusive one wire probes for detecting and validating logic and timing waveforms of signals generated by switching circuits.

Figure 5B:
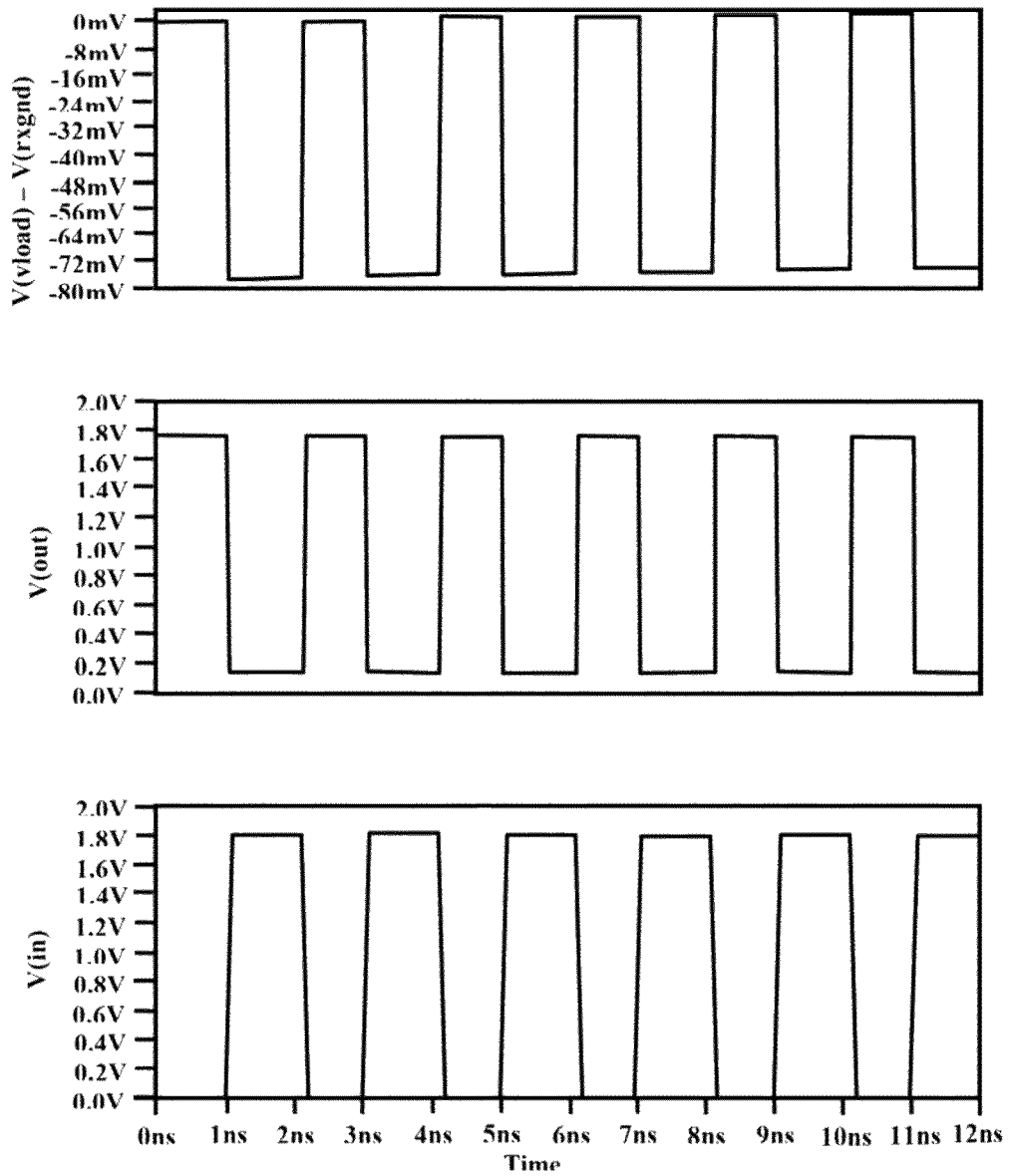
FIG. 5b and FIG. 5c illustrates different waveforms captured fir a circuit implementing modified inverter at transmitting end and a MOSFET circuit at receiving end, according to an embodiment herein.
Figure 5C:
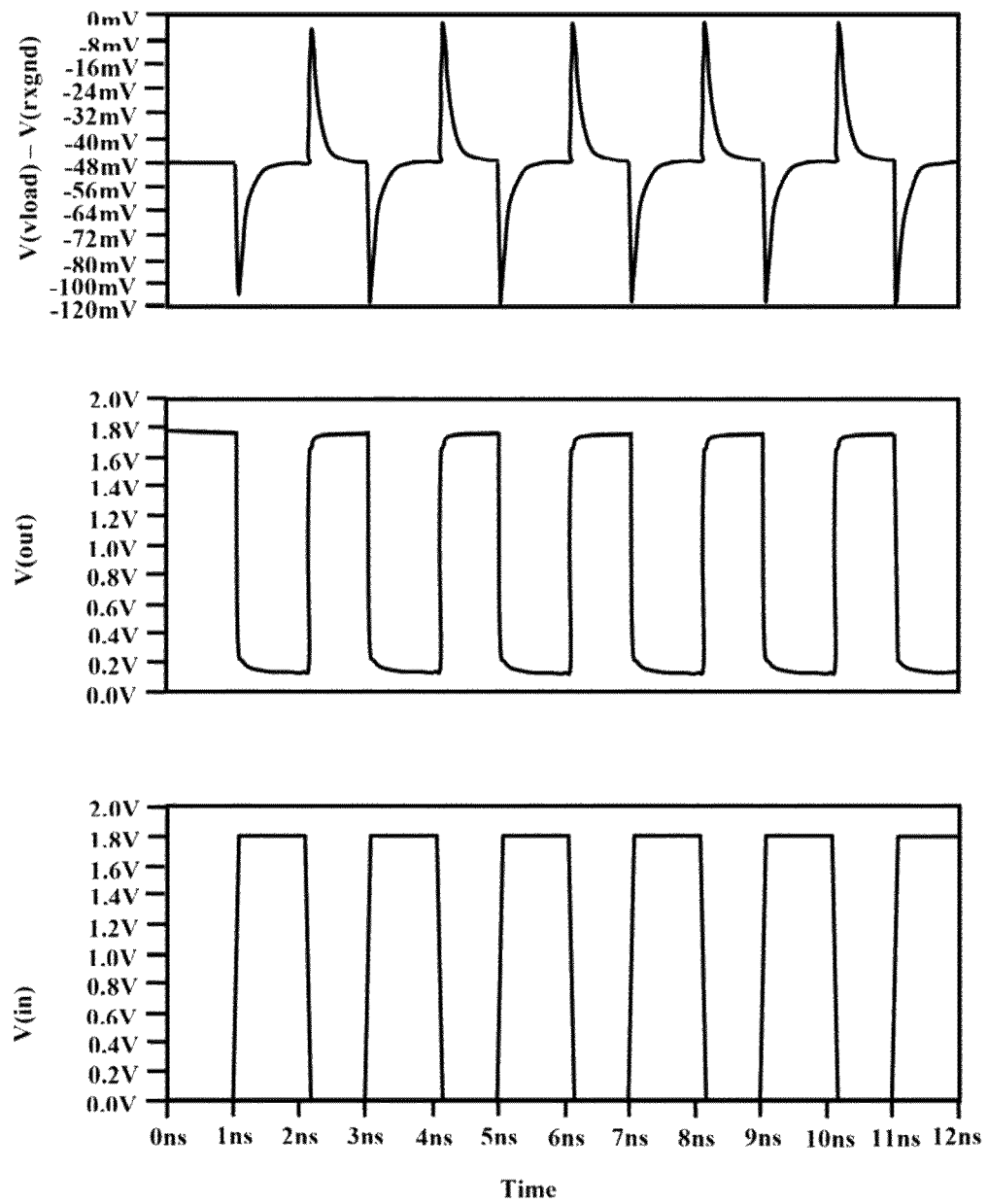

FIG. 5b and FIG. 5c illustrate different waveforms captured for a circuit implementing modified inverter at transmitting end and a MOSFET circuit at receiving end, according to an embodiment herein. The FIG. 5b and FIG. 5c individually displays three different voltage waveforms for the circuit illustrated in the FIG. 5a. The FIG. 5b captures the detected waveform when the gate capacitance is high while the FIG. 5c captures the corresponding waveform when the gate capacitance is low. The first waveform is a graph between the input voltage $V_{in}$ at the node "in" and time in ns. The second waveform is graph between the output voltage of the modified inverter at node "out" and time in nano seconds. The third signal waveform is a graph between the voltage V(vload)–V(rxgnd) at the load R3 and time in nano seconds. The signal waveform is detected using the MOSFET M1 varies depending on the gate capacitance relative to the signal frequency. To recover the transmitted signal, the AC component of the detected signal is passed through zero crossing detectors with hysteresis. Alternatively, positive and negative spikes are used to regenerate the transmitted signal using an SR flip flop.

According to one embodiment herein, any switching circuit that causes charge imbalances on a connected conductor while switching impedance elements connected to it generates a propagating disturbance on the connected conductor can be used to transmit signals. Since capacitors and inductors also offer different instantaneous impedances during different charging or switching states, the capacitors and inductors can also be used to generate propagating disturbances. The charge imbalances create localized electric fields which in turn produce magnetic fields, leading to a propagating wave on the conductor similar to an electromagnetic wave propagating in free space.

According to an embodiment herein, any radio receiver that is designed for the frequency band of interest can be used to detect a propagating charge disturbance wave by connecting the transmitting medium wire in place of the antenna connection. Depending on the frequency, passive elements such as capacitors or inductors are also allowed to be used to directly convert the electric and magnetic field variations into current or voltage variations to detect the incoming data signals. The electron density variation makes the line voltage look like positive and negative spikes whenever a level transition happens. So one shot triggers connected to an SR latch are used to indirectly regenerate the signal at the receiving end. The simplest receiver is just a simple delay line. As long as the length of the delay line is not an exact multiple of half the wavelength of the propagating wave, the propagating signal is detected across the delay line.

The embodiments disclosed herein offers higher data/signaling rates, lower delay, power and area. The implementation is also very simple and cost effective. When used as a single-wire probe for validation, it is less intrusive than conventional two wire probes. When used to build a parallel interface with multiple lines or for clock distribution to multiple destinations, the resulting timing skew between multiple destinations at different wire lengths is also very low. The ability to communicate without requiring a common around reference also enables better noise isolation for sensitive circuits. Since only line disturbances are monitored instead of absolute voltages or currents, the embodiments herein provides an ideal interface to interconnect circuits, systems and devices operating at different voltage levels or from independent power supplies. The embodiments herein facilitates to be used in an on chip and system level clock distribution, low power high speed serial interfaces for interconnecting different devices, low power memory interfaces for computers and mobile devices, test equipment for validation of switching signals of devices or timing validation at a system level, and for communicating between devices or circuits operating at different voltages without the need for level shifters.

According to the embodiments herein, a dual gate MOSFET can be used instead of a single gate MOSFET to ensure a steady gate capacitance by biasing the second gate. Further apart from inductor based receivers, the receiving end is allowed to use any one of a capacitor, inductor, delay line and a resistor based receiving schemas to detect the propagating signals.

Further, the receiving techniques discussed herein call be incorporated with the existing voltage and current level based transmitting schemas for detecting propagating waves generated by their switching devices.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

What is claimed is:

1. A system for communicating data over a wired connection, the system comprising:

a transmitting end having a switching circuit, said switching circuit configured to generate a propagating signal disturbance according to an input signal data received from a source network;

a receiving end having a receiver circuit, said receiver circuit configured to detect the propagating signal disturbance and further configured to regenerate the input signal data from the received signal, wherein the receiver further comprises at least one of an inductor, a capacitor, a resistor and a delay line connected to one of terminals of the wired connection to regenerate the propagating signal disturbance at the receiving end;

said system characterized in that the propagated signal disturbance is detected at the receiving end without a need for a common ground reference
wherein the propagating disturbances is created by inducing an electron distribution change at one end of the wired connection and propagated along the length of the wire, and wherein the propagating disturbance is generated using one of an inductor, a capacitor and a switching device, and wherein the receiver detects a current disturbance and subsequently generates a data signal and wherein said system is adapted to build at least one of a serial, parallel or a multipoint distribution communication interface between a transmitting device and at least one receiving device, and wherein the system is adapted to validate at least one of timing and logic of signals carried on at least one wired connection, without using a common ground reference.

2. The system of claim 1, wherein the wired connection includes a single wire conductor and an optional common ground connection.

3. The system of claim 1, wherein said system is adapted to communicate between circuits in different ground planes, and between circuits operating on different voltage levels.

4. The system of claim 1, wherein said system is adapted to communicate at a lower power between circuits having a common ground reference.

5. The system of claim 1, wherein at least one of the resistance, capacitance, inductance and a delay line between one or more terminals of a device is used to detect the propagating disturbance at the receiving end.

* * * * *